United States Patent
Dick et al.

(10) Patent No.: US 7,451,110 B2
(45) Date of Patent: Nov. 11, 2008

(54) SYSTEM, METHOD AND COMPUTER PROGRAM PRODUCT FOR PROVIDING AN EFFICIENT TRADING MARKET

(75) Inventors: Kevin Stewart Dick, Palo Alto, CA (US); Eric Kenneth Rescorla, Mountain View, CA (US)

(73) Assignee: Network Resonance, Inc., Palo Alto, CA (US)

( * ) Notice: Subject to any disclaimer, the term of this patent is extended or adjusted under 35 U.S.C. 154(b) by 1121 days.

(21) Appl. No.: 09/861,080

(22) Filed: May 18, 2001

(65) Prior Publication Data
US 2002/0174055 A1 Nov. 21, 2002

(51) Int. Cl.
*G06Q 40/00* (2006.01)
(52) U.S. Cl. ...................................... 705/37
(58) Field of Classification Search .............. 705/1, 705/35, 36 R, 37–40
See application file for complete search history.

(56) References Cited

U.S. PATENT DOCUMENTS

| | | | | |
|---|---|---|---|---|
| 5,671,364 | A * | 9/1997 | Turk | 705/39 |
| 6,076,071 | A * | 6/2000 | Freeny, Jr. | 705/26 |
| 6,236,972 | B1 * | 5/2001 | Shkedy | 705/1 |
| 6,314,402 | B1 | 11/2001 | Monaco et al. | |
| 6,401,074 | B1 | 6/2002 | Sleeper | |
| 6,742,119 | B1 * | 5/2004 | Peyravian et al. | 713/178 |
| 7,162,448 | B2 * | 1/2007 | Madoff et al. | 705/37 |
| 2002/0016984 | A1 | 2/2002 | Aratani et al. | |
| 2002/0035606 | A1 | 3/2002 | Kenton | |
| 2002/0056091 | A1 | 5/2002 | Bala et al. | |
| 2002/0091605 | A1 * | 7/2002 | Labe et al. | 705/36 |
| 2003/0028468 | A1 * | 2/2003 | Wong et al. | 705/37 |

OTHER PUBLICATIONS

PTI Trader's G;ossary-A☐☐Internet Waybackmachine—Apr. 26, 2001.*
Google Search—Definition "at the money".*
PTI Trader's Glossary—Internet waybackmachine—Apr. 26, 2001.*
Google: Definition "at the money".*

* cited by examiner

*Primary Examiner*—Hani M. Kazimi
*Assistant Examiner*—Olabode Akintola
(74) *Attorney, Agent, or Firm*—Paul, Hastings, Janofsky & Walker LLP

(57) ABSTRACT

A system, method and computer program product for providing a trading exchange are disclosed. A request for conducting trade of a security is received from a user. The security associated with requested trade is evaluated to generate a derivative security. A trade is then executed for the user using the derivative security. Information relating to the executed trade is captured utilizing a network so that the captured information can be utilized to adjust an account of the user in accordance with the executed trade.

18 Claims, 4 Drawing Sheets

SYSTEM, METHOD AND COMPUTER PROGRAM PRODUCT FOR PROVIDING AN EFFICIENT TRADING MARKET

FIELD OF THE INVENTION

This invention relates to trading systems and exchanges, and more particularly, relates to financial securities trading systems.

BACKGROUND OF THE INVENTION

The widespread availability of Internet-based securities trading has given rise to the day trading phenomenon. In day trading, individuals (who typically are not securities professionals) engage in short-term speculative trading of individual securities. Based on news, rumors, or momentum, these individuals buy small volumes of volatile securities and attempt to generate returns by selling them as they move up or down over the course of a single day, and in some cases a few days. Traditional securities markets do no support the needs of this type of investor. They are structured to serve the needs of investors who buy large volumes of securities and hold them for a considerable period of time. As a result, day traders incur unnecessarily high transaction costs and suffer the consequences of uncertainty with regards to the precise prices of the trades they wish to make.

Traditional securities markets require a counter-party for every trade. Extremely sophisticated trading systems, assemblages of robust networks, highly reliable hardware, and complex software, work to match buyers and sellers for every transaction.

Unfortunately, this process introduces two problems for the day trader. First, the required infrastructure and participation of multiple intermediaries makes the cost of executing a trade relatively high, on the order of 10 USD. Second, because the process requires a counter-party for each trade, a day trader does not always get the exact the price quoted by the market. Clearing trades involves matching the pipelines of buy and sell orders based on their bid and ask prices as well as their size. Often, delays incurred by the trading system or mismatches in order size result in day traders buying or selling at a slightly different price than they thought. Because the day trader makes returns on relatively small price differences in the buy and sell trades, such differences can greatly decrease the overall return.

SUMMARY OF THE INVENTION

A system, method and computer program product for providing a trading exchange are disclosed. A request for conducting trade of a security is received from a user. The security associated with requested trade is evaluated to generate a derivative security. A trade is then executed for the user using the derivative security. Information relating to the executed trade is captured utilizing a network so that the captured information can be utilized to adjust an account of the user in accordance with the executed trade.

In one aspect of the present invention, the derivative security may be dynamically generated. In another aspect, the derivative security may have a price equal to a price of the security at a time the request was issued. In a further aspect, the trade may comprise a purchase. In such an aspect, the user may be required to sell the derivative security within a predetermined time period. In an additional aspect, the user may be limited to hold an amount of the derivate security having a value equal to less than a predetermined percentage of an aggregate value of the security.

In even another aspect of the present invention, the request from the user may include a user identifier identifying the user, a security identifier identifying the security and a timestamp identifying a time that the request was made. In such an aspect, at least a portion of the timestamp may be cryptographically signed. In a further aspect, the user may be permitted to add or remove funds from the account. In yet another aspect, the request may be received utilizing the network.

DETAILED DESCRIPTION

Figure 1:
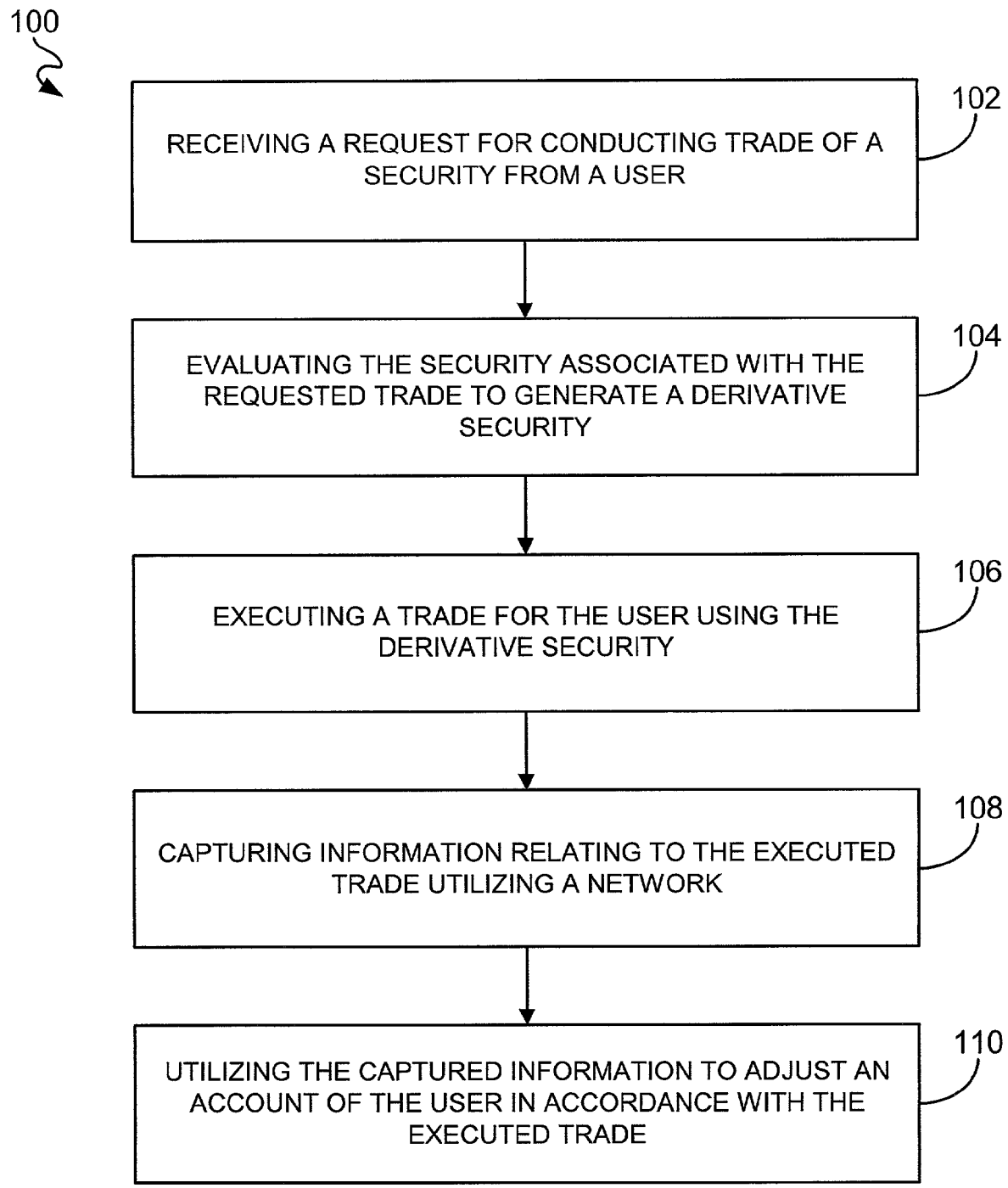
FIG. 1 is a flowchart of a process for providing a virtual trading exchange in accordance with an embodiment of the present invention.

FIG. 1 is a flowchart of a process 100 for providing a virtual trading exchange in accordance with an embodiment of the present invention. A request for conducting trade of a security is received from a user in operation 102. The security associated with requested trade is evaluated to generate a derivative security of the security in operation 104. A trade is then executed for the user using the derivative security in operation 106. Information relating to the executed trade is captured utilizing a network in operation 108 so that the captured information can be utilized to adjust an account of the user in accordance with the executed trade in operation 110.

In one aspect of the present invention, the derivative security may be dynamically generated. In another aspect, the derivative security may have a price equal to a price of the security at a time the request was issued. In a further aspect, the trade may comprise a purchase. In such an aspect, the user may be required to sell the derivative security within a predetermined time period such as, for example, by the end of the trading day or by the end of the month. In an additional aspect, the user may be limited to hold an amount of the derivate security having a value equal to less than a predetermined percentage of an aggregate value of the associated security from which the derivative security was derived.

In even another aspect of the present invention, the request from the user may include a user identifier identifying the user, a security identifier identifying the security and a timestamp identifying a time that the request was made. In such an aspect, at least a portion of the timestamp may be encrypted before it is transmitted. Additionally, the derivate security has a purchase price equal to a purchase price of the associate security at the time (as indicated by the timestamp) that the request was made. In a further aspect, the user may be permitted to add or remove funds from the account via the network. In yet another aspect, the request may be received and the trade executed utilizing the network.

Figure 2:
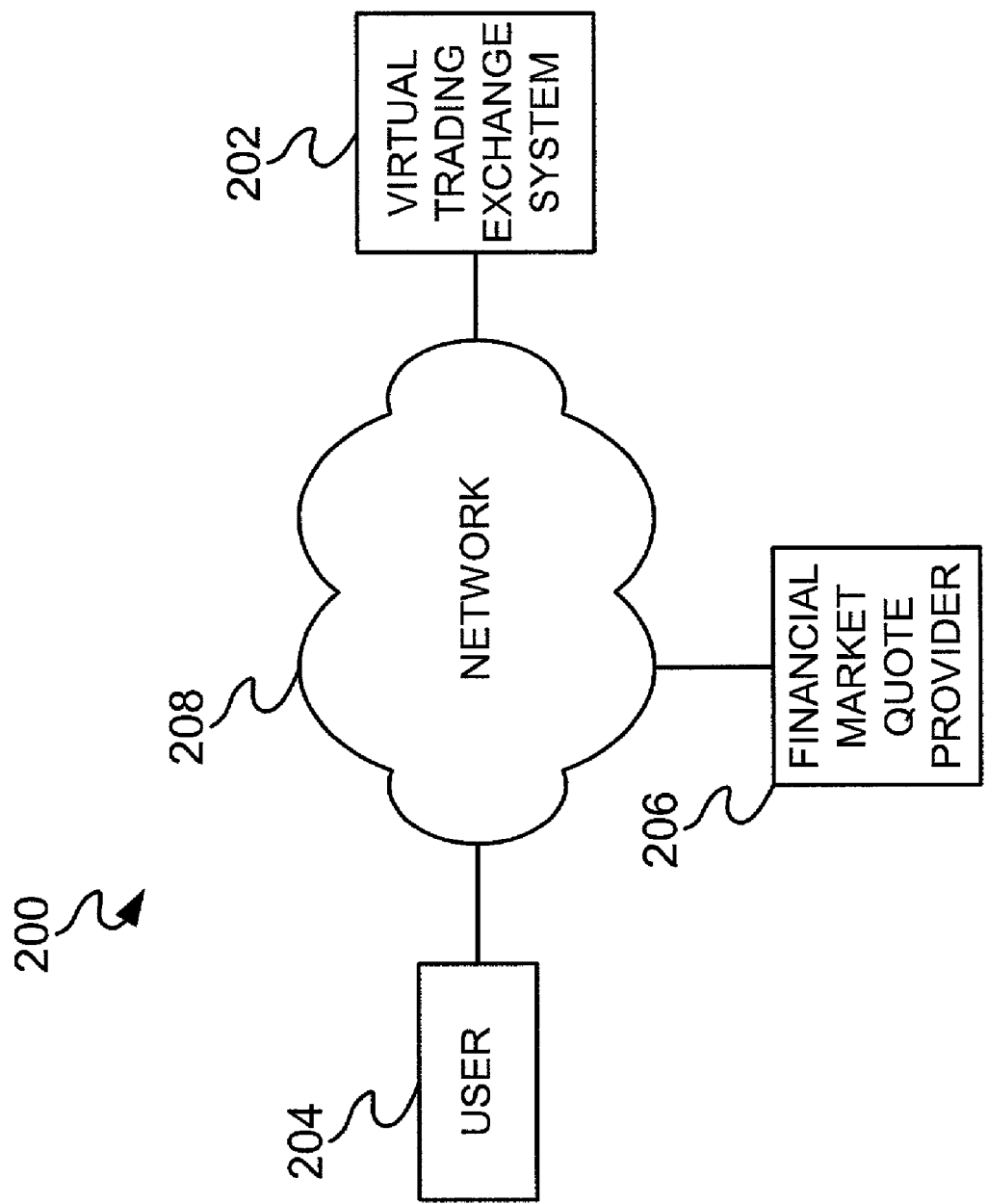
FIG. 2 is a schematic representation of a framework capable of providing a virtual trading exchange in accordance with an embodiment of the present invention.

FIG. 2 is a schematic representation of a framework 200 capable of providing a virtual trading exchange in accordance with an embodiment of the present invention. As illustrated in FIG. 2, the framework includes a virtual trading exchange system 202 in communication with one or more users 204 and a provider of financial market quotes 206 (such as a provider of a financial ticker) via a network 208 so that virtual trading exchange system may at least receive information from the user(s) and financial market quotes provider utilizing the network. As an additional option, the virtual exchange system may also utilize the network to transmit information to the user(s) and the financial market quotes provider. The virtual trading exchange system may include for example: at least one capturing component for capturing information from either the user(s), the financial market quotes provider, or both; a derivative component for generating derivatives; transaction component for executing trades utilizing the generated derivatives, and an archiving component for storing information collected or generated or used by the other component s of the virtual trading exchange system.

In order to help make the day trading market more efficient, embodiments of the present invention utilize a virtual trading exchange system by which the following process may be executed:

1. Open accounts with the virtual trading system.
2. Evaluate securities to trade. These securities must maximize the applicability of information traders already have at their disposal about traditional securities.
3. Execute trades at a desired price. This execution must maximize the proximity of the actual trade price to the quoted price and minimize the ability of non-day traders to game the system.
4. Capture trades and record them. This capture should maximize the throughput of the system and minimize the chances of error.
5. Settle accounts with the customer.

In accordance with an embodiment of the present invention, users may be required buy securities through the virtual trading exchange system with established funds. To accomplish this, users may open an account with a deposit of funds. In one embodiment of the present invention, in order to help avoid additional regulation or liability, the virtual trading exchange system may decide not to allow trading on margin, though it could do so without loss of generality. Also, minimizing the ability of people to game the system argues for having a maximum account value so that a large investor could not expose backers of the virtual trading exchange system to too much risk. However, such a limit may imply a limit on the size of the initial deposit.

In order to maximizing the applicability of information users already have, virtual versions of existing securities may be offered. This is possible through the use of derivatives. Derivatives are securities whose prices are tied to the performance of other securities or well-published financial indicators. In particular, a derivative is a financial instrument whose characteristics and value depend upon the characteristics and value of an underlying instrument or asset, typically a commodity, bond, equity or currency. Some examples of derivatives include futures and options. Typically, such traditional derivates are primarily used to reduce risk, though there is often a healthy amount of speculation in the market as well. Monte Carlo simulation is a technique for estimating the solution of a numerical mathematical problem by means of an artificial sampling experiment. This is an established numerical method for the valuation of derivative securities. Its major strength is flexibility, and it may be applied to almost any problem, including history-dependent claims or empirically characterized security processes.

In an embodiment of the present invention, the virtual trading exchange system may use derivatives to create a "shadow market" for traditional securities. So when a user wanted to make a trade related to a particular traditional security, the virtual trading exchange system may automatically create a derivative of that security. The purchase price of this derivative may be exactly the same as the price of the original security at the time of purchase. The user then has the right to sell the derivative at the same price as that of the original security at time of sale. To minimize the ability of non-day traders to game the system, there may have to be a number of restrictions including:

1. The derivative may have a limited lifetime to prevent "buy and hold" investors from using the system. This lifetime may be as short as the end of the business day on which it is purchased. It may also be as long as a month. Much longer than that and the owner/operator of the virtual trading exchange system may be exposed to "buy and hold" investors. If a user held a derivative at its expiration, the virtual trading exchange system could then automatically sell it at the then current price.
2. An individual may not be allowed establish too large of a position in any one derivative. Otherwise, it may be possible to create imbalances between the actual market and the derivative market. In one embodiment, this restriction may take the form of a percentage limit on the aggregate value of the actual security. Financial models may be utilized to determine the position limit applied to classes of securities.
3. An individual may not be allowed to make too large of a trade in any one derivative. Otherwise, it may be possible to create imbalances between the actual market and the derivative market. In one embodiment, this restriction may take the form of a percentage limit on the daily trading volume of the actual security. Financial models would determine the trade size limit policy applied to classes of securities.
4. An individual may not be allowed to establish a portfolio over a particular aggregate value. Otherwise, the individual may be able to create enough diversification on a large enough portfolio that the exchange would have to greatly increase its reserves. In one embodiment, the restriction would take the form of a total dollar value. If a particular purchase would cause the value of the individual's portfolio to exceed this value, the trade would not be allowed. Financial models would determine the portfolio value limit policy applied to classes of securities.

If at least a portion of these restriction are met, the actual execution of the trade may utilize a user identifier, a security identifier, and a secure timestamp sent to the trading system. This approach enables the capture portion of the trade to maximize throughput and minimize errors. Because the virtual trading exchange system does not need to clear trades through a traditional exchange, the only information the virtual trading exchange system needs relating to the trade is the user, the security, and the price. However, the price could be open to dispute or errors, but the time is much more easily established.

The throughput of pairing up and saving a user identifier, a securities identifier, and timestamp may be enormous. The capture system may then asynchronously compare the timestamp to a recorded data feed of market quotes to determine the price and makes the appropriate entries in the affected financial accounts. This asynchronous account processing helps to prevents this step from becoming a bottleneck to throughput. Having the original user identifier, securities identifier, and timestamp makes it easy to verify and remedy any errors in this transcription process.

Settling accounts occurs on a monthly basis. The virtual trading exchange system may generate an account statement showing all trades, their affect on the user's total position, and this total position at the end of the month. The virtual trading exchange system may also be capable of notifying users if their account balance is under an acceptable limit, in which case they must add more funds to the accounts. The virtual trading exchange system also notifies users if their account balanced is over an acceptable limit, in which case The virtual trading exchange system may include a check for the excess or execute a bank transfer as specified by the user.

Because the virtual trading exchange system does not find a counter-party for each transaction, the virtual trading exchange system may need to cover the trades itself. It is possible to do this because of the sub-optimality of the day trading strategy. Theoretically, the day trading strategy produces a lower return at the same level of risk as other strategies because it lacks diversification. Empirical evidence bears out this theory. Studies show that day traders as whole generate substantially lower returns than major indices. Moreover, a large percentage of day traders actually lose money over the long term. Most importantly, even over the period of a month, the number of day traders that exceed the returns of these indices and the amount by which they exceed these indices is relatively small. Therefore, given a large enough reserve, the backer of the virtual trading exchange system could cover all day trades by investing customer funds in one of these major indices. The difference between the returns of these indices and the aggregate returns of all users would be gains. To create the reserve, the virtual trading exchange system may offer diversified investors the opportunity to buy shares in the reserve and split these gains. Financial models such a Monte Carlo or Value-at-Risk may then be used to determine the size of the required reserve. Note that these gains may be in addition to any subscription or transaction fees charged to users.

Figure 3:
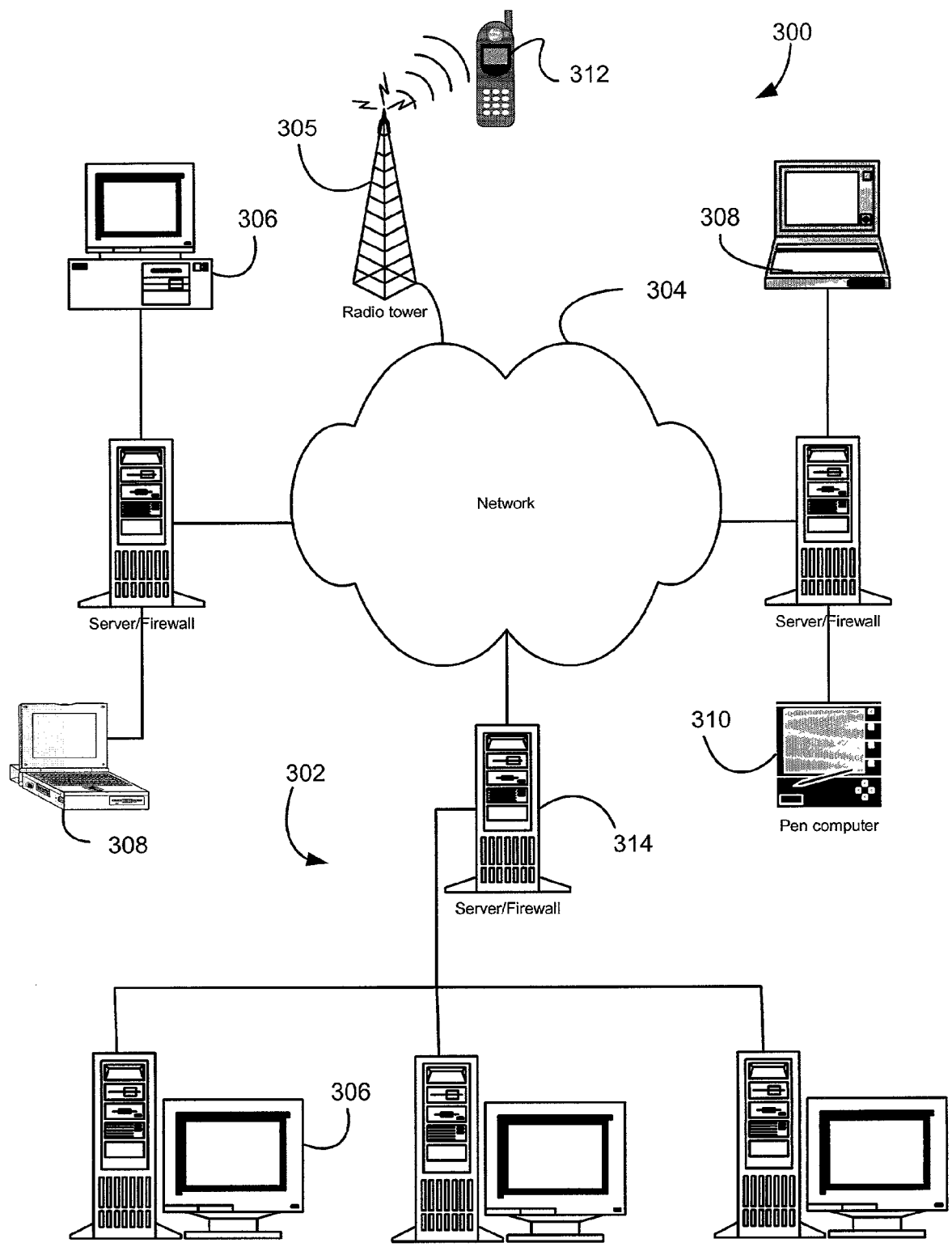
FIG. 3 is a schematic diagram of an illustrative system with a plurality of components in accordance with an embodiment of the present invention.

FIG. 3 illustrates an exemplary system 300 with a plurality of components 302 in accordance with one embodiment of the present invention. As shown, such components include a network 304 which take any form including, but not limited to a local area network, a wide area network such as the Internet, and a wireless network 305. Coupled to the network 304 is a plurality of computers which may take the form of desktop computers 306, lap-top computers 308, hand-held computers 310 (including wireless devices 312 such as wireless PDA's or mobile phones), or any other type of computing hardware/software. As an option, the various computers may be connected to the network 304 by way of a server 314 which may be equipped with a firewall for security purposes. It should be noted that any other type of hardware or software may be included in the system and be considered a component thereof.

Figure 4:
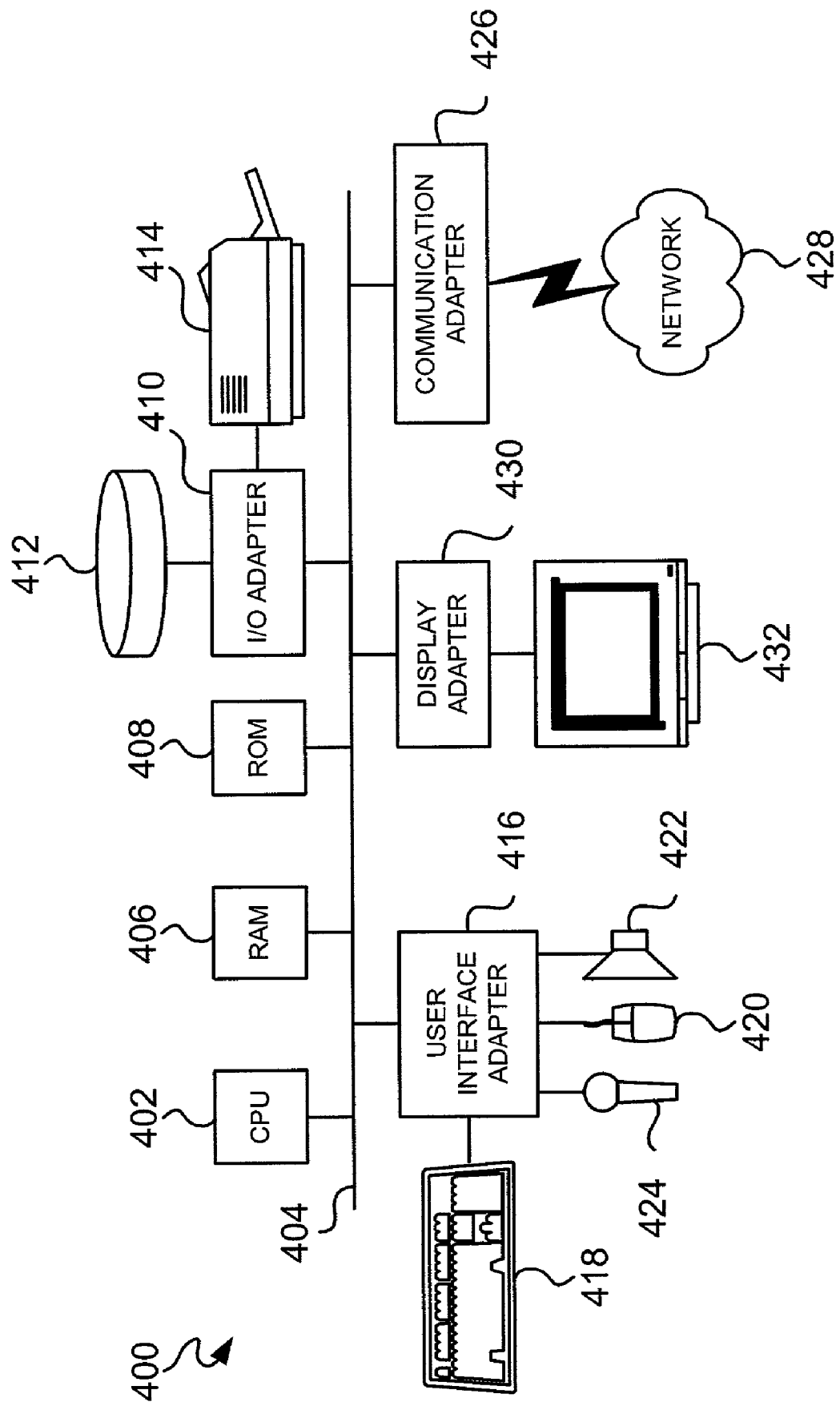
FIG. 4 is a schematic diagram of a representative hardware environment in accordance with an embodiment of the present invention.

A representative hardware environment associated with the various components of FIG. 3 is depicted in FIG. 4. In the present description, the various sub-components of each of the components may also be considered components of the system. For example, particular software modules executed on any component of the system may also be considered components of the system. FIG. 4 illustrates an illustrative hardware configuration of a workstation 400 having a central processing unit 402, such as a microprocessor, and a number of other units interconnected via a system bus 404.

The workstation shown in FIG. 4 includes a Random Access Memory (RAM) 406, Read Only Memory (ROM) 408, an I/O adapter 410 for connecting peripheral devices such as, for example, disk storage units 412 and printers 414 to the bus 404, a user interface adapter 416 for connecting various user interface devices such as, for example, a keyboard 418, a mouse 420, a speaker 422, a microphone 424, and/or other user interface devices such as a touch screen or a digital camera (not shown) to the bus 404, a communication adapter 426 for connecting the workstation 400 to a communication network 428 (e.g., a data processing network) and a display adapter 430 for connecting the bus 404 to a display device 432.

Also, an article of manufacture, such as a pre-recorded disk or other similar computer program product, for use with a data processing system, could include a storage medium and program means recorded thereon for directing the data processing system to facilitate the practice of the invention. Such apparatus and articles of manufacture also fall within the spirit and scope of the invention.

In accordance with an embodiment of the present invention, Transmission Control Protocol/Internet Protocol (TCP/IP) may be utilized. TCP/IP is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.)

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

In accordance with an aspect of the present invention, XML (Extensible Markup Language) may be utilized to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that wants to share information in a consistent way.

XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page.

Early applications of XML include Microsoft's Channel Definition Format (CDF), which describes a channel, a portion of a Web site that has been downloaded to your hard disk and is then is updated periodically as information changes. A specific CDF file contains data that specifies an initial Web page and how frequently it is updated. Another early application is ChartWare, which uses XML as a way to describe medical charts so that they can be shared by doctors. Applications related to banking, e-commerce ordering, personal preference profiles, purchase orders, litigation documents, part lists, and many others are anticipated.

As set forth previously, various information generated in the present system may encrypted. Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII.). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

Secure Sockets Layer (SSL) is a commonly-used protocol for managing the security of a message transmission on the Internet. SSL uses a program layer located between the Internet's Hypertext Transfer Protocol (HTTP) and Transport Control Protocol (TCP) layers. The "sockets" part of the term refers to the sockets method of passing data back and forth between a client and a server program in a network or between program layers in the same computer. SSL uses the public-and-private key encryption system from RSA, which also includes the use of a digital certificate.

A digital signature is an electronic rather than a written signature that can be used by someone to authenticate the identity of the sender of a message or of the signer of a document. It can also be used to ensure that the original content of the message or document that has been conveyed is unchanged. Additional benefits to the use of a digital signature are that it is easily transportable, cannot be easily repudiated, cannot be imitated by someone else, and can be automatically time-stamped.

A digital signature can be used with any kind of message, whether it is encrypted or not, simply so that the receiver can be sure of the sender's identity and that the message arrived intact. A digital certificate contains the digital signature of the certificate-issuing authority so that anyone can verify that the certificate is real.

An embodiment of the present invention may also be written using Java, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

- Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.
- Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
- Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H. Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and inter-operate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of inter-operability with existing applications and data; and
Inability to scale.

Sun Microsystems's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to Java is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for Java without undue experimentation to practice the invention.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for providing a trading exchange comprising computer-implemented steps of:
   receiving a request to execute a trade of a security from a user at a current price of the security;
   generating a derivative security for the security, wherein the derivative security has a price equal to a price of the security at a time the request was issued;
   executing the trade requested by the user using the derivative security instead of the security, the trade of the derivative security being executed without finding a counterparty for the trade of the security; capturing information, from the user and a financial market quotes provider, relating to the executed trade and the security utilizing a network, the captured information including the financial market price of the security at the time of the request; and utilizing the captured information to adjust an account of the user in accordance with the executed trade.

2. The method of claim 1, wherein the derivative security is dynamically generated.

3. The method of claim 1, wherein the trade comprises a purchase.

4. The method of claim 3, wherein the derivative security has a limited lifetime, and the derivative security is automatically sold if the derivative is held by the user at the end of the limited lifetime.

5. The method of claim 1, wherein the user is limited by the trading exchange to hold an amount of the derivate security having a value equal to less than a predetermined percentage of an aggregate value of the security.

6. The method of claim 1, wherein trades involving a total value of the user's portfolio are restricted.

7. The method of claim 1, wherein the request from the user includes a user identifier identifying the user, a security identifier identifying the security and a timestamp identifying a time that the request was made.

8. The method of claim 7, wherein at least a portion of the timestamp is cryptographically signed, and wherein the timestamp is compared to a recorded data feed of market quotes to determine a price of the security.

9. The method of claim 1, wherein the user is permitted to add or remove funds from the account.

10. The method of claim 1, wherein the request is received utilizing the network.

11. A system for providing a trading exchange, comprising:
    a capture component for receiving a request to execute a trade of a security at a current price of the security from a user in communication with a network, the request including a user identifier identifying the user, a security identifier identifying the security and a timestamp identifying a time that the request was made;
    a derivative component for generating a derivative security for the security, the derivative security having the same price as the security at a time the request was issued;
    a transaction component for executing the trade requested by the user using the derivative security instead of the security, the trade of the derivative being executed without finding a counterparty for the trade of the security;
    the capture component capturing information from a financial market quotes provider relating to the security utilizing the network; and
    a component for asynchronously comparing the timestamp of the request with the captured information from the financial market quotes provider to determine the price of the security at the time of the request and adjusting an account of the user in accordance with the executed trade and the determined price.

12. The system of claim 11, wherein the derivative security is dynamically generated.

13. The system of claim 11, wherein the trade comprises a purchase.

14. The system of claim 13, wherein the derivative security has a limited lifetime, and the derivative security is automatically sold if the derivative is held by the user at the end of the limited lifetime.

15. The system of claim 11, wherein the user is limited by the trading exchange to hold an amount of the derivate security having a value equal to less than a predetermined percentage of an aggregate value of the security.

16. The system of claim 11, wherein trades involving a total value of the user's portfolio are restricted.

17. The system of claim 11, wherein the request from the user includes a user identifier identifying the user, a security identifier identifying the security and a timestamp identifying a time that the request was made, and wherein the timestamp is compared to a recorded data feed of market quotes to determine a price of the security.

18. A computer-readable medium having computer-executable instructions which when executed by a computing device performs a method for providing a trading exchange, comprising: receiving a request to execute a trade of a security from a user at a current price of the security; generating a derivative security for the security, wherein the derivative security has a price equal to a price of the security at a time the request was issued; executing the trade requested by the user using the derivative security instead of the security, the trade of the derivative security being executed without finding a counterparty for the trade of the security; capturing information, from the user and a financial market quotes provider, relating to the executed trade and the security utilizing a network, the captured information including the financial market price of the security at the time of the request; and utilizing the captured information to adjust an account of the user in accordance with the executed trade.

* * * * *